United States Patent
Sheth (10) Patent No.: US 7,313,598 B1
(45) Date of Patent: Dec. 25, 2007

(54) METHOD AND APPARATUS FOR PARTIAL REPLICATION OF DIRECTORY INFORMATION IN A DISTRIBUTED ENVIRONMENT

(75) Inventor: Anish Ichhalal Sheth, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 700 days.

(21) Appl. No.: 10/171,735

(22) Filed: Jun. 13, 2002

(51) Int. Cl.
G06F 15/16 (2006.01)
G06F 15/173 (2006.01)

(52) U.S. Cl. ............... 709/211; 709/208; 709/226

(58) Field of Classification Search ............ None
See application file for complete search history.

(56) References Cited

U.S. PATENT DOCUMENTS

| | | | | |
|---|---|---|---|---|
| 5,758,337 A * | 5/1998 | Hammond | ............... | 707/6 |
| 5,873,096 A * | 2/1999 | Lim et al. | ............... | 707/201 |
| 6,389,448 B1 * | 5/2002 | Primak et al. | ............... | 718/105 |
| 6,618,360 B1 * | 9/2003 | Scoville et al. | ............... | 370/248 |
| 6,751,674 B1 * | 6/2004 | Satagopan et al. | ............... | 709/249 |
| 6,751,746 B1 * | 6/2004 | Jain et al. | ............... | 714/4 |
| 6,757,896 B1 * | 6/2004 | Cohen et al. | ............... | 718/100 |
| 6,920,580 B1 * | 7/2005 | Cramer et al. | ............... | 714/4 |
| 2002/0120637 A1 * | 8/2002 | Parham et al. | ............... | 707/201 |
| 2002/0174225 A1 * | 11/2002 | Smith et al. | ............... | 709/226 |
| 2003/0028695 A1 * | 2/2003 | Burns et al. | ............... | 710/200 |
| 2003/0088587 A1 * | 5/2003 | Merrells et al. | ............... | 707/201 |
| 2003/0088615 A1 * | 5/2003 | Good et al. | ............... | 709/203 |
| 2003/0088656 A1 * | 5/2003 | Wahl et al. | ............... | 709/223 |
| 2003/0172158 A1 * | 9/2003 | Pillai et al. | ............... | 709/225 |
| 2005/0015381 A1 * | 1/2005 | Clifford et al. | ............... | 707/100 |

OTHER PUBLICATIONS

M. Wahl et al., "Lightweight Directory Access Protocol (v3)," http://www.ietf.org/rfc/rfc2251.txt, pp. 1-45, Dec. 1997.

* cited by examiner

*Primary Examiner*—Kenny Lin
(74) *Attorney, Agent, or Firm*—Hickman Palermo Truong & Becker LLP (57) ABSTRACT

A method is disclosed for partially replicating directory information from a master directory server to one or more distributed directory servers. Distributed directory servers are established in a network that partially replicates master directory information from the master directory server. Filter criteria that define a subset of the master directory information for replication is received from an application that uses the master directory information. The subset of the master directory information is received, and stored in at least one distributed directory server. The subset of the master directory information can be a sub-tree, or a subset of a sub-tree, of the master directory information.

13 Claims, 4 Drawing Sheets

METHOD AND APPARATUS FOR PARTIAL REPLICATION OF DIRECTORY INFORMATION IN A DISTRIBUTED ENVIRONMENT

FIELD OF THE INVENTION

The present invention generally relates to network computing. The invention relates more specifically to a method and apparatus for partial replication of directory information in a distributed environment.

BACKGROUND OF THE INVENTION

A directory is, in general, an approach to organizing information. In computer networks, a directory is, typically, a repository that stores information about users, user passwords, and information about network resources that the users can access. Originally, a directory service was unique to a specific application such as e-mail or to a specific operating system. In contrast, a universal directory is independent of both applications and network operating systems.

LDAP (Lightweight Directory Access Protocol) is a software protocol for enabling applications to locate organizations, individuals, and other resources such as files and devices in a network, such as the public Internet or on a corporate intranet. LDAP is based on X.500, a CCITT (the predecessor to the ITU-T [International Telecommunication Union-Telecom Standardization]) standard for directory services in a network. LDAP is a widely accepted protocol that is supported in most, if not all, of the major directories, so it is included in various browser and e-mail client applications, and is also supported in various networking products. Version 3 of LDAP is partially described in RFC 2251 from the Network Working Group of the Internet Engineering Task Force (IETF).

In a network, a directory tells an application where in the network something is located. On TCP/IP networks, for example, LDAP allows an application to search for an individual or resources without knowing where they are located. An LDAP directory is organized in a "tree" hierarchy (DIT [Directory Information Tree]) consisting of the following levels: (1) the root node (the starting place or the source of the tree), which branches out to (2) countries, each of which branches out to (3) organizations, which branch out to (4) organizational units (divisions, departments, and so forth), which branch out to (includes an entry for) (5) individual resources, including people, files, and shared resources such as printers.

An LDAP directory can be distributed among many servers. Each distributed directory server can have a replicated version of the master directory, or of a sub-tree of the master directory, that is synchronized periodically. Therefore, distributed resources have access to the desired directory information in a distributed directory server when connection to the master directory server is lost. Currently, there are at least two replication draft protocols which can be used for implementing replication: (1) the Change Log protocol; and (2) LCUP (LDAP Client Update Protocol).

Servers implementing LCUP provide a cookie to the client (i.e., a distributed directory server) containing the state information for the client. With each replication request, the client sends the cookie, and the master directory server returns only the changes made to the master directory since the last replication to the client.

The Change Log protocol works on the basis of a change log. The master directory server has a container that contains a list of changed entries. Each change log entry contains an incremental unique change log number and the details of the entry, change type, and the changes made to the entry. This container is obtained by reading the "changeLog" attribute from the master directory server. The client retrieves all the changeLog entries with a changeLog number equal to and greater than its last replicated changeLog number for a particular directory.

The foregoing approaches are useful for performing replication of a master directory where the entire directory is replicated and distributed or where an entire sub-tree of the directory is replicated and distributed. For example, assume the following:

the top of a directory tree (or a "sub-tree") is represented as "o=cisco.com" (at a level equivalent to level 3 above); and one sub-tree of the directory tree is represented as "dn: ou=Users, o=cisco.com" (Note that there can be multiple such sub-trees under "o=cisco.com"); and there are 10,000 entries under the sub-tree, similar to the following two entries.

dn: cn=userjtapi,ou=Users, o=cisco.com
objectClass: top
objectClass: inetOrgPerson
objectClass: ciscoocUser
mail: userjtapi;
dn: cn=xyz,ou=Users, o=cisco.com
objectClass: top
objectClass: inetOrgPerson
objectClass: ciscoocUser
mail: xyz.

Prior replication approaches requires replication of all 10,000 entries under "ou=Users, o=cisco.com". However, partial replication of a directory on distributed servers is not previously available. That is, replication of only 100 of the 10,000 entries is not available in past approaches.

In this context, partial replication refers to replication of only a subset of a sub-tree of the total directory. For example, one might only want to replicate a branch or sub-tree of the master directory that includes directory information for a specific business unit, office location, etc.

Known approaches cannot maintain a partially replicated distributed directory, that is, they cannot distribute and maintain a subset of a sub-tree of a directory on a distributed directory server. The past approaches also cannot replicate or maintain a plurality of different partial replications on a plurality of different distributed directory servers. For example, LDAP defines a replication function call, but it can only replicate a complete sub-tree of the directory. Hence, based on the foregoing, there is a clear need for a technique for partially replicating directory sub-tree information from a master directory server to distributed directory servers.

Unless otherwise indicated herein, the approaches described in this section are not prior art to the claims in this application and are not admitted to be prior art by inclusion in this section.

SUMMARY OF THE INVENTION

The foregoing needs, and other needs and objects that will become apparent for the following description, are achieved in the present invention, which comprises, in one aspect, a method for partially replicating directory information from a master directory server to one or more distributed directory servers. Partial replication refers to replication of only a subset of a sub-tree of a directory.

Distributed directory servers, which partially replicate master directory information from the master directory server, are established in a network. Filter criteria that define a subset of the master directory information for replication are received from an application that uses the master directory information. The subset of the master directory information is received, and stored in at least one distributed directory server.

In one embodiment, a log containing updates to the master directory information is received. The filter criteria are applied to the log to create the subset of the master directory information. In one embodiment, a query that includes the filter criteria is sent to the master directory server to request the subset of the master directory information.

In one embodiment, whether a network connection between the master directory server and the distributed directory server on which the subset (i.e., a subset of a sub-tree of a directory) is stored is functional, is determined. If the network connection is not functioning, then the subset of the master directory information is retrieved from the directory server on which the subset is stored. If the network connection is functioning, then the subset of the master directory information is retrieved from the master directory server over the network.

In one embodiment, at least one distributed directory server is established on a routing device. Furthermore, in a related embodiment, an application program that uses the directory information and that provided the filter criteria is executed on the routing device.

In one embodiment, the frequency of receiving the subset of the master directory information is determined, based at least on network performance information related to the distributed directory server on which the subset is stored. In one embodiment, the frequency of receiving the subset of the master directory information is determined, based at least on distributed directory server performance information for the distributed directory server on which the subset is stored.

In other aspects, the invention encompasses computer apparatus and a computer readable medium to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for partially replicating directory information from a master directory server to one or more distributed directory servers is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

Figure 1:
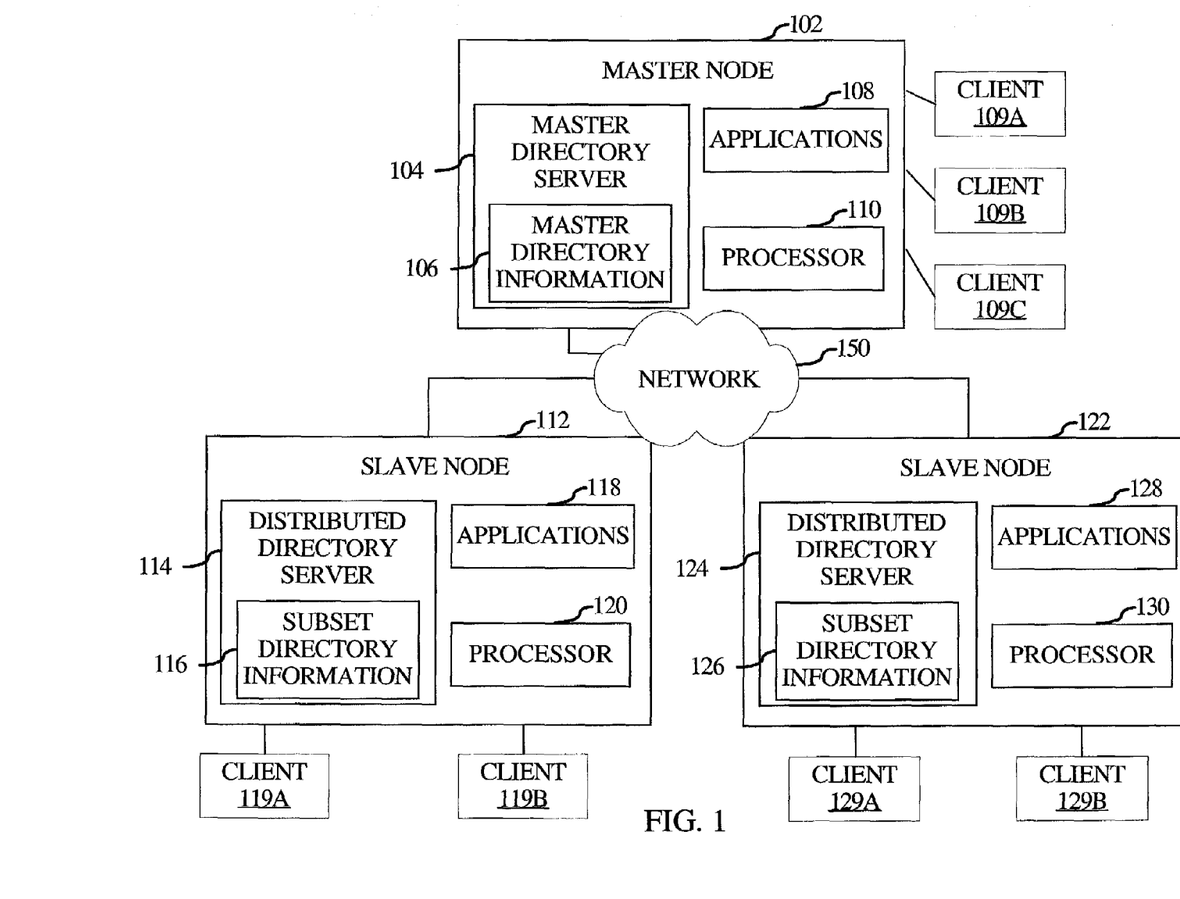
FIG. 1 is a block diagram illustrating an example of an operational environment in which embodiments of the invention may be implemented.

FIG. 1 is a block diagram illustrating an example of an operational environment in which the invention may be implemented. The operational environment of FIG. 1 is described herein to provide context for the invention, however, it not intended to limit the scope or use of the invention.

FIG. 1 illustrates a distributed computing environment, which comprises a master node 102 and a plurality of slave nodes 112 and 122, communicatively coupled through a network 150. One or more clients 109A, 109B, 109C, etc. are coupled to node 102 directly or indirectly through a local network. Master node 102 comprises a master directory server 104, which stores master directory information 106. In addition, the master node 102 may comprise one or more applications 108 that interface with the master directory server 104 to access and use the master directory information 106 stored therein, although use of such applications 108 is not required. In this example, and throughout this description, a voice-mail (VM) application will be utilized for purposes of example. Master node 102 may be configured to serve all of the associated applications 108 that rely on the master directory information 106 and all of the client machines that use the associated applications 108, using one or more master processors 110. The applications 108, or possibly client-side portions thereof, may reside alternatively on the clients 109A, 109B, 109C.

The slave nodes 112, 122 facilitate the distribution of some of the application processing away from the master node 102. For example, within an organization, different office locations may each have a slave node such as node 112, 122. Hence, clients 119A, 119B connected to the slave node 112 and clients 129A, 129B connected to the slave node 122, at different office locations, can locally execute applications 118, 128, respectively, instead of relying on the master node 102 for computational resources. Two slave nodes and two pairs of clients are depicted for purposes of illustrating a simple example, however, any number of slave nodes or clients may be configured to interact with master node 102.

Each of the clients 109A, 109B, 109C, 119A, 119B, 129A, 129B may comprise a software process, agent, or application; a hardware device such as a terminal, workstation, personal computer, or personal digital assistant; or a combination of the foregoing. Thus the term "client" refers broadly to any processing entity that needs directory information.

Slave nodes 112, 122 are similar in function, but can support different applications, such as applications 118, 128, respectively. Therefore, each of slave nodes 112, 122 can have different directory information, such as subset directory information 116, 126, respectively. Thus, unless otherwise indicated, when one of the slave nodes is referenced herein, the reference is intended to apply, generally, to each of a plurality of slave nodes that operate similarly but independently.

An application 118 executing on a processor 120 at a slave node 112, such as a VM application, may rely on directory information for execution. Thus, directory information (e.g., subset directory information 116) is typically stored on a distributed directory server (e.g., distributed directory server 114) at each slave node (e.g., slave node 112). In past approaches, initial storage of the subset directory information 116 on the distributed directory server 114 typically used a replication process to replicate a complete sub-tree of the master directory information 106 on a distributed directory server at each slave node. Subsequently, updating subset directory information 116 on a distributed directory server does not necessitate a complete download of the master directory information 106, but can utilize information about the changes made to the complete master directory information 106.

As previously defined, "partial replication" is used herein to refer to a replication process associated with only a subset of a sub-tree of the total master directory information 106, or one or more such subsets, including both the initial storage of the subset, and updates of the subset. Furthermore, "subset" is used herein to refer to a subset of a sub-tree of a directory. Thus, a subset of the master directory information 106 (i.e., subset directory information 116) is associated with a subset of a sub-tree of the master directory information 106. Non-limiting examples of subset directory information 116 might include directory information for a specific business unit, office location, range of names, etc.

According to one embodiment, the distributed directory server, such as distributed directory server 114, and/or a distributed processor 120, are established on a network routing device, such as a router. The subset directory information 116 is stored on the routing device. Furthermore, in a related embodiment, the applications 118 may be stored on, and are executed on, the same routing device. For example, a router might be configured with a plug-in "card" comprising the logic (i.e., application) and the processing and storage resources needed to run the application, including a distributed directory server. Implementation of the techniques described herein is not limited to a routing device, for the techniques are applicable in any number of processing machines, such as a conventional computer or server.

Process for Partially Replicating Directory Information

Figure 2A:
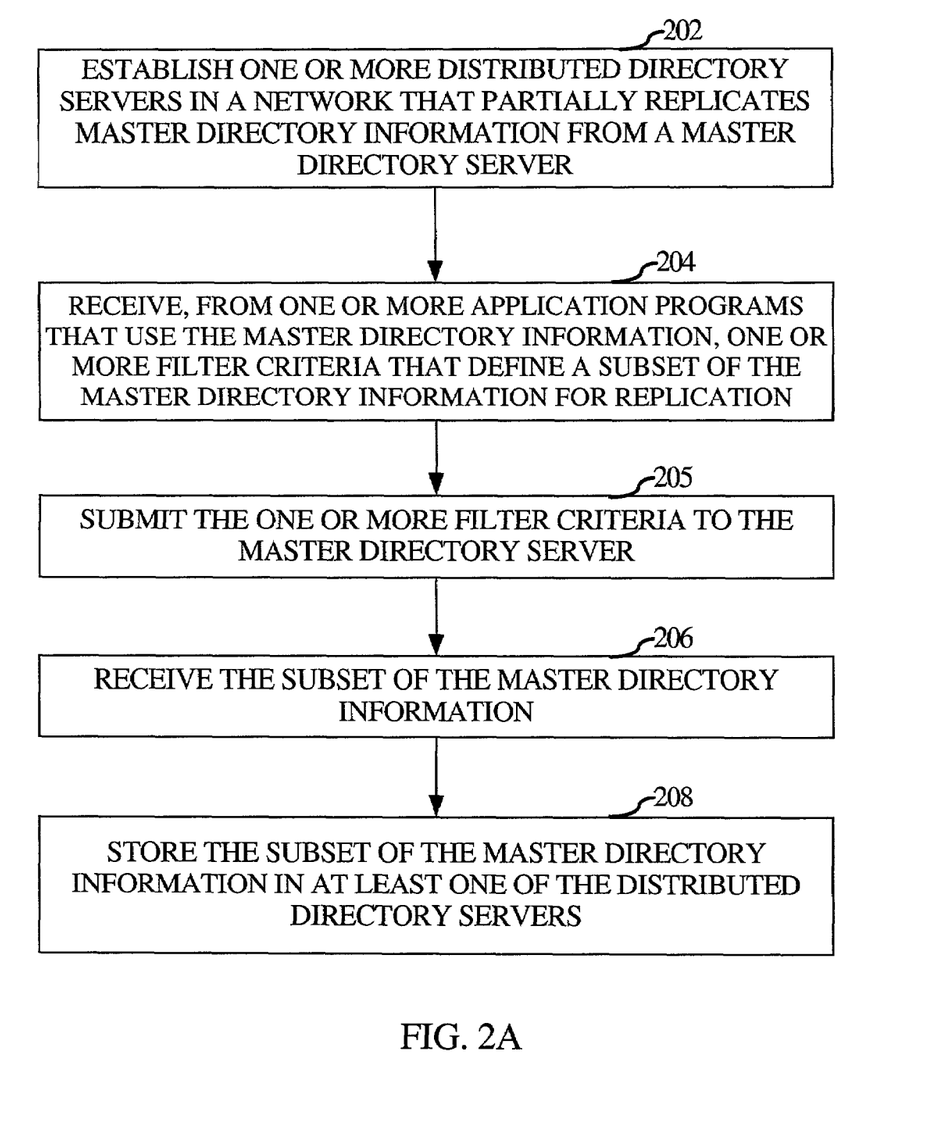
FIG. 2A is a flowchart illustrating a process for partially replicating directory information from a master directory server to one or more distributed directory servers.

FIG. 2A is a flowchart illustrating a process for partially replicating directory information from a master directory server to one or more distributed directory servers. Some of the components of FIG. 1 are referred to in examples of the processes of FIGS. 2A and 2B. However, the invention is not limited to the implementations in these examples.

At block 202, one or more distributed directory servers are established in a network that partially replicates master directory information from a master directory server. For example, slave nodes 112 and 122 (FIG. 1) that include distributed directory servers 114 and 124 (FIG. 1), respectively, are established at a plurality of sites within an enterprise organization.

At block 204, one or more filter criteria that define a subset of the master directory information 106 (FIG. 1) for replication, are received from one or more application programs 118 (FIG. 1). For example, a VM application that uses a master directory of names, phone extension, and other user data may provide filter criteria to limit the subset of the master directory information 106 to subset directory information 116 (FIG. 1) comprising user data for only those VM users who work at a specific office location.

Each application of the one or more applications 118 (FIG. 1) may rely on a different subset of the master directory information 106 (FIG. 1). Each application 118 may provide a different filter criteria to request a respective subset of the master directory information 106 to be stored locally as subset directory information 116 (FIG. 1). Therefore, the subset directory information 116 at any given distributed directory server 114 (FIG. 1) may be composed of a combination of a plurality of subsets of the master directory information 106, based on filter criteria from a plurality of applications 118, in order to support the associated applications. Furthermore, each distributed directory server 114 may store different subset directory information 116, based on needs of each server's corresponding applications.

Block 204 may involve receiving the filter criteria as part of an initial configuration of the application program as part of an initial establishment of the distributed directory servers. Alternatively, block 204 may form part of a periodic update process that transfers changes or updates from the master directory server to the distributed directory servers, as detailed below.

In one embodiment, at block 205 the filter criteria is submitted to the master directory server. For example, an LDAP query having the filter criteria as its arguments is sent from a distributed directory server to the master directory server.

At block 206, the subset of the master directory information (e.g., subset directory information 116) is received. For example, the subset is received at distributed directory server 114 (FIG. 1). The subset of the master directory information that is received is based on the filter criteria of one or more application programs (e.g., applications 118). In one embodiment, the subset of the master directory information is received from the master directory server 104 (FIG. 1). Alternatively, the subset of the master directory information may not be received directly from the master directory server 104, but may be received from another entity. For example without limitation, the subset may be received from a proxy server acting as a proxy for the master directory server 104, or from another distributed directory server, such as server 124 (FIG. 1).

At block 208, the subset of the master directory information is stored in at least one of the distributed directory servers (e.g., distributed directory server 114). Therefore, the portion of the master directory information 106 (FIG. 1) that is pertinent to a given application 118 (FIG. 1) is available locally to run the given application at or from a respective slave node. The given application and the processor (e.g., processor 120) that runs the application may reside at the slave node (e.g., slave node 112) or may reside on a client (e.g., client 119) machine.

Thus, as a result of the process of FIG. 2A, a distributed directory server is established, and stores only a subset of a complete master directory, as defined by one or more filter criteria from one or more applications that use the subset of the directory information.

Significantly, the complete master directory information 106 (FIG. 1) is not stored locally at each slave node. Any desired sub-tree, tree branch or other grouping of nodes or entries of the directory may be moved to one or more of the distributed directory servers and maintained as a subset. Consequently, computing and storage resources are optimized at each slave node. This feature is especially beneficial to an implementation configured on a machine or platform, such as a router, with a limited amount of storage capacity. These techniques can eliminate the need for a dedicated directory server at each slave node. Furthermore, if a network connection between a particular slave node and the master node 102 (FIG. 1) is not functioning, then the pertinent subset of the master directory information that is stored locally at that slave node is available to the applications supported by that slave node.

In one embodiment, the step of receiving the subset of the master directory information in block 204 comprises receiving a log containing updates to the master directory information, and applying the filter criteria to the log to create the subset. As described in the Background section, an existing process for updating replicated directory information (e.g., in LDAP-supported environments) utilizes a Change Log protocol and associated changelog entries that include some representation of an event timestamp or some other event-incrementing methodology. Thus, for example, a given filter criteria can be applied to the Change Log to identify only information, from a given subset of the master directory information, that has been updated since the last update of the subset, i.e., since the last partial replication. This embodiment is applicable to a scenario in which a subset of the master directory information 106 (FIG. 1) has previously been replicated on a distributed directory server 114 (FIG. 1).

In one embodiment, a query that includes the filter criteria from the one or more applications is sent to the master directory server 104 (FIG. 1) to request the specific subset of the master directory information. This embodiment is applicable to a scenario in which a subset of the master directory information 106 (FIG. 1) has previously been replicated on a distributed directory server 114 (FIG. 1), and a scenario in which the subset of the master directory information 106 is being originally replicated on a distributed directory server 114.

Various embodiments are directed to determining the frequency of receiving the subset of the master directory information. According to one embodiment that is applicable to a scenario in which a subset of the master directory information 106 (FIG. 1) has previously been replicated on a distributed directory server 114 (FIG. 1), the frequency of receiving the subset is based at least in part on network performance information for the distributed directory server 114 on which the subset is stored. For example, the rate of replication for a given distributed directory server 114 can be determined based on the bandwidth capacity/limitations associated with the network connection between the master directory server 104 (FIG. 1) and the given distributed directory server 114.

According to one embodiment that is applicable to a scenario in which a subset of the master directory information 106 (FIG. 1) has previously been replicated on a distributed directory server 114 (FIG. 1), the frequency of receiving the subset is based at least in part on distributed directory server performance information for the distributed directory server 114 on which the subset is stored. For example, the rate of replication for a given distributed directory server 114 can be determined based on the processing power of the given distributed directory server 114.

In addition, in some scenarios, the subset of the master directory information for replication can be periodically transmitted to the respective distributed directory servers 114 by the master directory server 104. This transmission can be automatic, that is, from the master directory server 104 without a direct request from the distributed directory server 114.

Figure 2B:
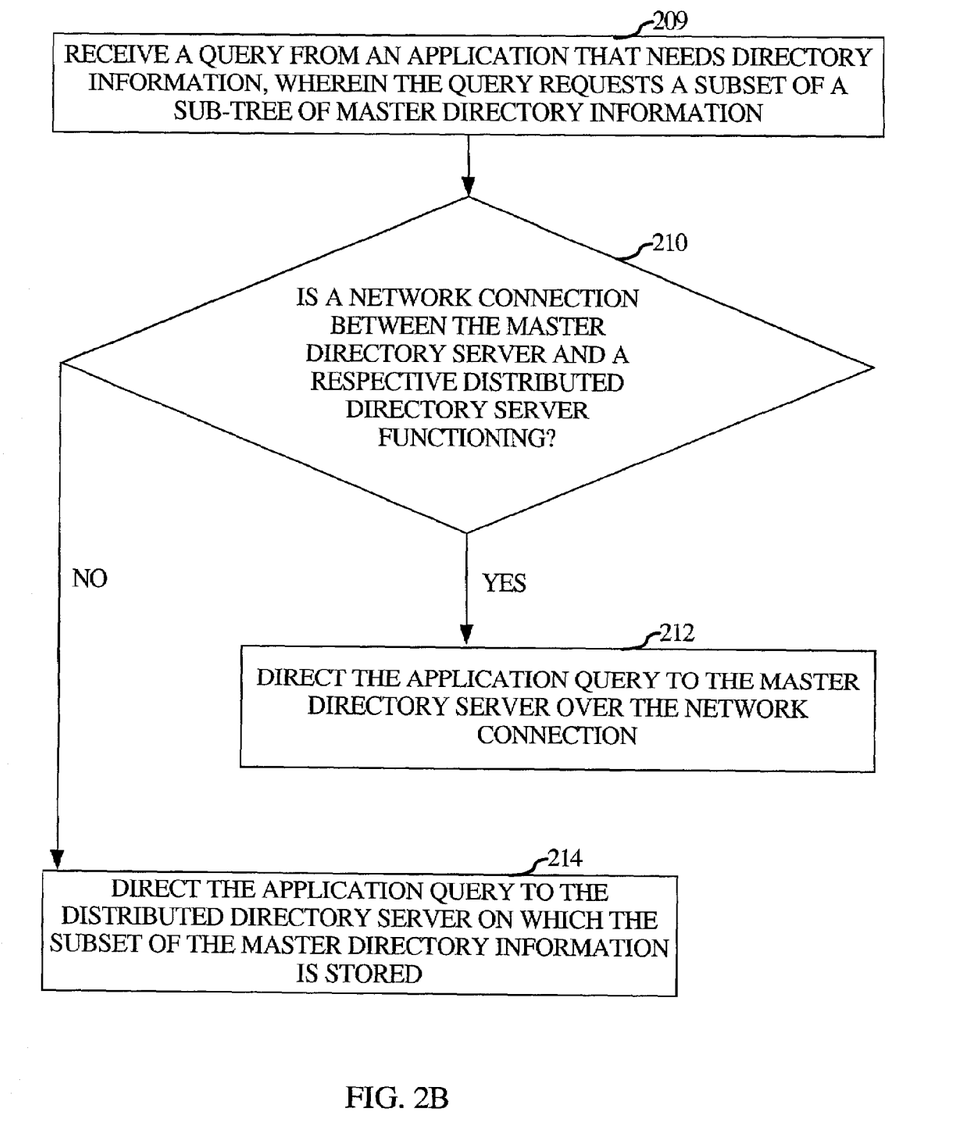
FIG. 2B is a flowchart illustrating further steps of a process for partially replicating directory information from a master directory server to one or more distributed directory servers.

FIG. 2B is a flowchart illustrating further steps of a process for partially replicating directory information from a master directory server to one or more distributed directory servers, as depicted in FIG. 2A.

In block 209, a query from an application that needs directory information is received, wherein the query requests a subset of a sub-tree of master directory information. For example, the query is received at distributed directory server 114 (FIG. 1). Block 209 may involve, for example, clients 119A, 119B or applications 118 issuing an LDAP query for particular directory information. The request typically includes associated filter criteria that specify, directly or indirectly, the desired subset of a sub-tree of the master directory information. Normally the directory information sought in the query is within the scope of the subset directory information 116.

At decision block 210, it is determined whether a network connection between the master directory server 102 (FIG. 1), where the master directory information is stored and/or managed, and at least one distributed directory server 114 (FIG. 1) on which the subset of master directory information is stored, is functioning. Various methods are known in the art for testing a network connection. Therefore, the invention is not limited to any particular method of testing a network connection, and any may be used.

If the determination at block 210 is positive, then at block 212 the query from the application is directed to the master directory information of the master directory server 104 (FIG. 1) over the network connection 150 (FIG. 1). Thus, the distributed directory server 114 (FIG. 1) acts as a proxy to the requesting application 118 (FIG. 1), thereby passing the request to the master directory server 104. This ensures that the query receives the most current data available.

If the determination at block 210 is negative, then at block 214 the query from the application is directed to the subset of the master directory information at the at least one distributed directory server 114 (FIG. 1) on which it is stored. In this alternative, the application query is serviced locally from the subset directory information 116 (FIG. 1), even when network connection 150 is down.

Implementation Mechanisms

Hardware Overview

Figure 3:
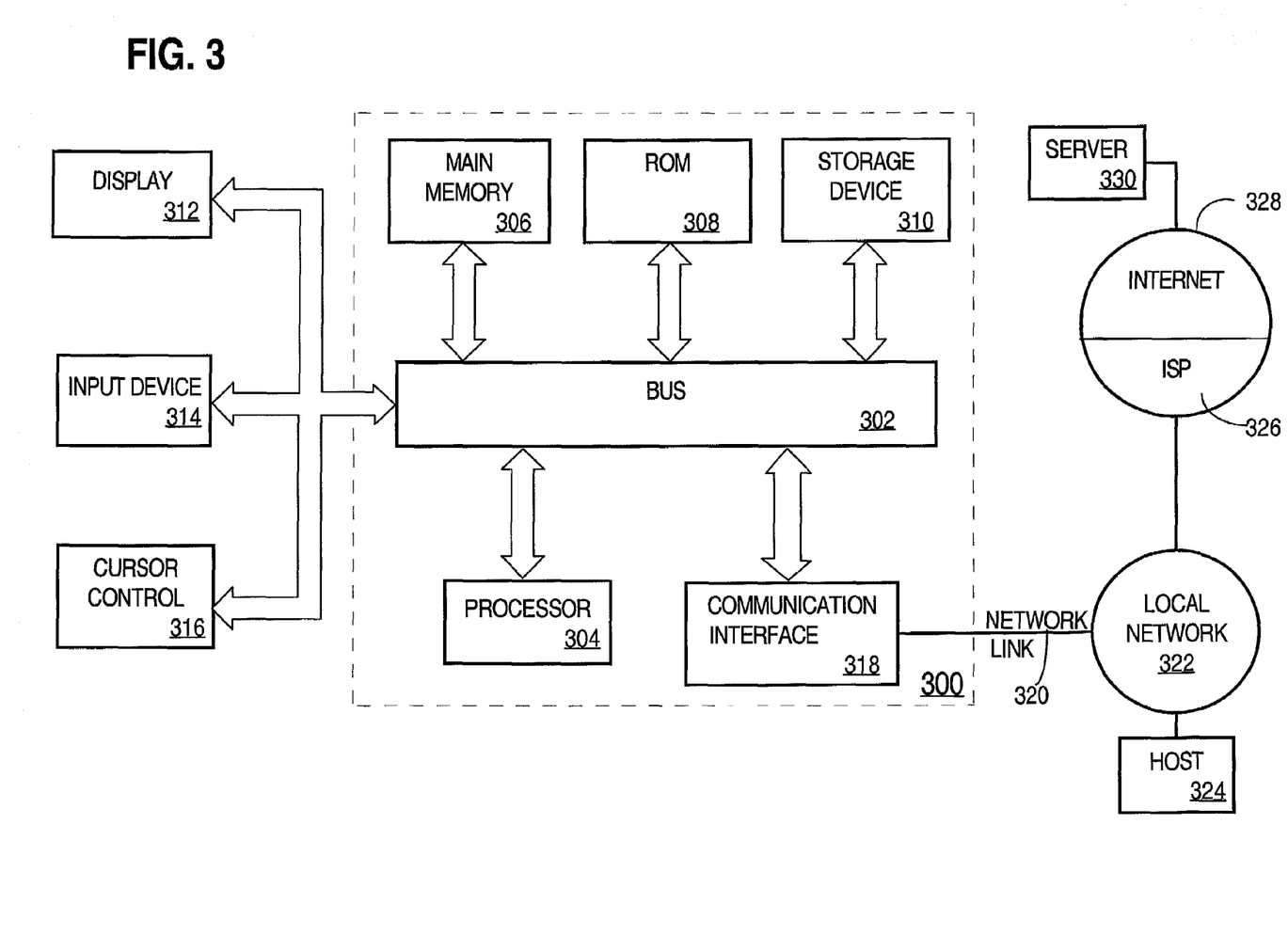
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory ("RAM") or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory ("ROM") 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube ("CRT"), for displaying information to a computer user. An input device 314, including alphanumeric and other keys, is coupled to bus 302 for communicating information and command selections to processor 304. Another type of user input device is cursor control 316, such as a mouse, trackball, stylus, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for partially replicating directory information from a master directory sever to one or more distributed directory servers. According to one embodiment of the invention, the approaches described herein are provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network ("ISDN") card or a modem to provide a data communication connection to a corresponding type of telephone line. As another example, communication interface 318 may be a local area network ("LAN") card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider ("ISP") 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for partially replicating directory information from a master directory sever to one or more distributed directory servers, as described herein.

The received code may be executed by processor 304 as it is received, and/or stored in storage device 310, or other non-volatile storage for later execution. In this manner, computer system 300 may obtain application code in the form of a carrier wave.

EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method of partially replicating directory information from a master directory server to one or more associated slave directory servers, the method comprising the computer-implemented steps of:

receiving, at a network routing device configured to operate as a slave directory server used by one or more application programs that use master directory information, a request that includes one or more filter criteria that define a subset of a sub-tree of the master directory information for replication, wherein the master directory information is stored at a master directory server, determining, based at least in part on processing power of the slave directory server, how often the slave directory server receives the subset of the sub-tree of the master directory information;

if a network connection between the master directory server and the network routing device is functioning, then at the network routing device:
- sending to the master directory server, using a directory access protocol, a directory access protocol request comprising a query that includes the one or more filter criteria;
- receiving the subset of the sub-tree of the master directory information from the master directory server in a directory access protocol response; and
- storing only the subset of the sub-tree of the master directory information in the slave directory server; and if the network connection between the master directory server and the network routing device is not functioning, then at the network routing device:
- if the subset of the sub-tree of the master directory information is stored at the slave directory server, then serving from the slave directory server only the subset, and
- if the subset of the sub-tree of the master directory information is not stored at the slave directory server, then directing the query to a different slave directory server on which the subset is stored.

2. The method as recited in claim 1, wherein the step of receiving the subset of the master directory information from the master directory server further comprises the steps of:
- receiving a log containing updates to the master directory information; and
- applying the filter criteria to the log to create the subset of the master directory information.

3. The method as recited in claim 1, further comprising the computer implemented step of:
- executing, on the routing device, at least one application program from the one or more application programs using the subset of the master directory information.

4. The method as recited in claim 1, further comprising the computer implemented step of:
- determining, based at least in part on network performance information for the slave directory server, how often the slave directory server receives the subset of the sub-tree of the master directory information.

5. A computer-readable storage medium storing one or more sequences of instructions for partially replicating directory information from a master directory server to one or more associated slave directory servers, which instructions, when executed by one or more processors, cause the one or more processors to carry out the steps of:
- receiving, at a network routing device configured to operate as a slave directory server used by one or more application programs that use master directory information, a request that includes one or more filter criteria that define a subset of a sub-tree of the master directory information for replication, wherein the master directory information is stored at a master directory server;
- determining, based at least in part on processing power of the slave directory server, how often the slave directory server receives the subset of the sub-tree of the master directory information;
- if a network connection between the master directory server and the network routing device is functioning, then at the network routing device:
  - sending to the master directory server, using a directory access protocol, a directory access protocol request comprising a query that includes the one or more filter criteria;
  - receiving the subset of the sub-tree of the master directory information from the master directory server in a directory access protocol response; and
  - storing only the subset of the sub-tree of the master directory information in the slave directory server; and
- if the network connection between the master directory server and the network routing device is not functioning, then at the network routing device:
  - if the subset of the sub-tree of the master directory information is stored at the slave directory server, then serving from the slave directory server only the subset, and
  - if the subset of the sub-tree of the master directory information is not stored at the slave directory server, then directing the query to a different slave directory server on which the subset is stored.

6. An apparatus for partially replicating directory information from a master directory server to one or more associated slave directory servers, comprising:
- means for receiving, at a network routing device configured to operate as a slave directory server used by one or more application programs that use master directory information, a request that includes one or more filter criteria that define a subset of a sub-tree of the master directory information for replication, wherein the master directory information is stored at a master directory server;
- means for determining, based at least in part on processing power of the slave directory server, how often the slave directory server receives the subset of the sub-tree of the master directory information;
- means in the network routing device for sending to the master directory server, using a directory access protocol, a directory access protocol request comprising a query that includes the one or more filter criteria, if a network connection between the master directory server and the network routing device is functioning;
- means for receiving the subset of the sub-tree of the master directory information from the master directory server in a directory access protocol response;
- means for storing the subset of the sub-tree of the master directory information in the slave directory server;
- means in the network routing device for serving from the slave directory server only the subset of the sub-tree of the master directory information if the subset is stored at the slave directory server and if the network connection between the master directory server and the network routing device is not functioning;
- means for directing the query to a different slave directory server on which the subset is stored if the subset is not stored at the slave directory server and if the network connection between the master directory server and the network routing device is not functioning.

7. The apparatus of claim 6, wherein the means for receiving the subset of the sub-tree of the master directory information from the master directory server comprises:

means for receiving a log containing updates to the master directory information; and means for applying the filter criteria to the log to create the subset of the sub-tree of the master directory information.

8. The apparatus of claim 6, comprising:

means for executing, on the network routing device, at least one application program from the one or more application programs.

9. The apparatus of claim 6, comprising:

means for determining, based at least in part on network performance information for the slave directory server, how often the slave directory server receives the subset of the sub-tree of the master directory information.

10. An apparatus for partially replicating directory information from a master directory server to one or more associated slave directory servers over a packet-switched data network, comprising:

a network interface that is coupled to the data network for receiving one or more packet flows therefrom;

a processor;

one or more stored sequences of instructions which, when executed by the processor, cause the processor to carry out the steps of:

receiving, at a network routing device configured to operate as a slave directory server used by one or more application programs that use master directory information, a request that includes one or more filter criteria that define a subset of a sub-tree of the master directory information for replication, wherein the master directory information is stored at a master directory server;

determining, based at least in part on processing power of the slave directory server, how often the slave directory server receives the subset of the sub-tree of the master directory information;

if a network connection between the master directory server and the network routing device is functioning, then at the network routing device:

sending to the master directory server, using a directory access protocol, a directory access protocol request comprising a query that includes the one or more filter criteria;

receiving the subset of the sub-tree of the master directory information from the master directory server in a directory access protocol response; and storing only the subset of the sub-tree of the master directory information in the slave directory server; and if the network connection between the master directory server and the network routing device is not functioning, then at the network routing device:

if the subset of the sub-tree of the master directory information is stored at the slave directory server, then serving from the slave directory server only the subset, and if the subset of the sub-tree of the master directory information is not stored at the slave directory server, then directing the query to a different slave directory server on which the subset is stored.

11. The apparatus of claim 10, wherein the one or more stored sequences of instructions cause the processor to carry out the step of receiving the subset of the sub-tree of the master directory information from the master directory server by causing the processor to carry out the steps of:

receiving a log containing updates to the master directory information; and applying the filter criteria to the log to create the subset of the sub-tree of the master directory information.

12. The apparatus of claim 10, wherein the one or more stored sequences of instructions cause the processor to carry out the step of:

executing, on the network routing device, at least one application program from the one or more application programs.

13. The apparatus of claim 10, wherein the one or more stored sequences of instructions cause the processor to carry out the step of:

determining, based at least in part on network performance information for the slave directory server, how often the slave directory server receives the subset of the sub-tree of the master directory information.

* * * * *